March 20, 1962     G. J. HAAN ETAL     3,026,093
SINK STRUCTURE FOR ULTRASONIC CLEANING Filed Aug. 20, 1958     2 Sheets-Sheet 1

Inventor
GILBERT J. HAAN
JOHN M. DEL VENTO by Hill, Sherman, Meroni, Gross & Simpson   Attys.

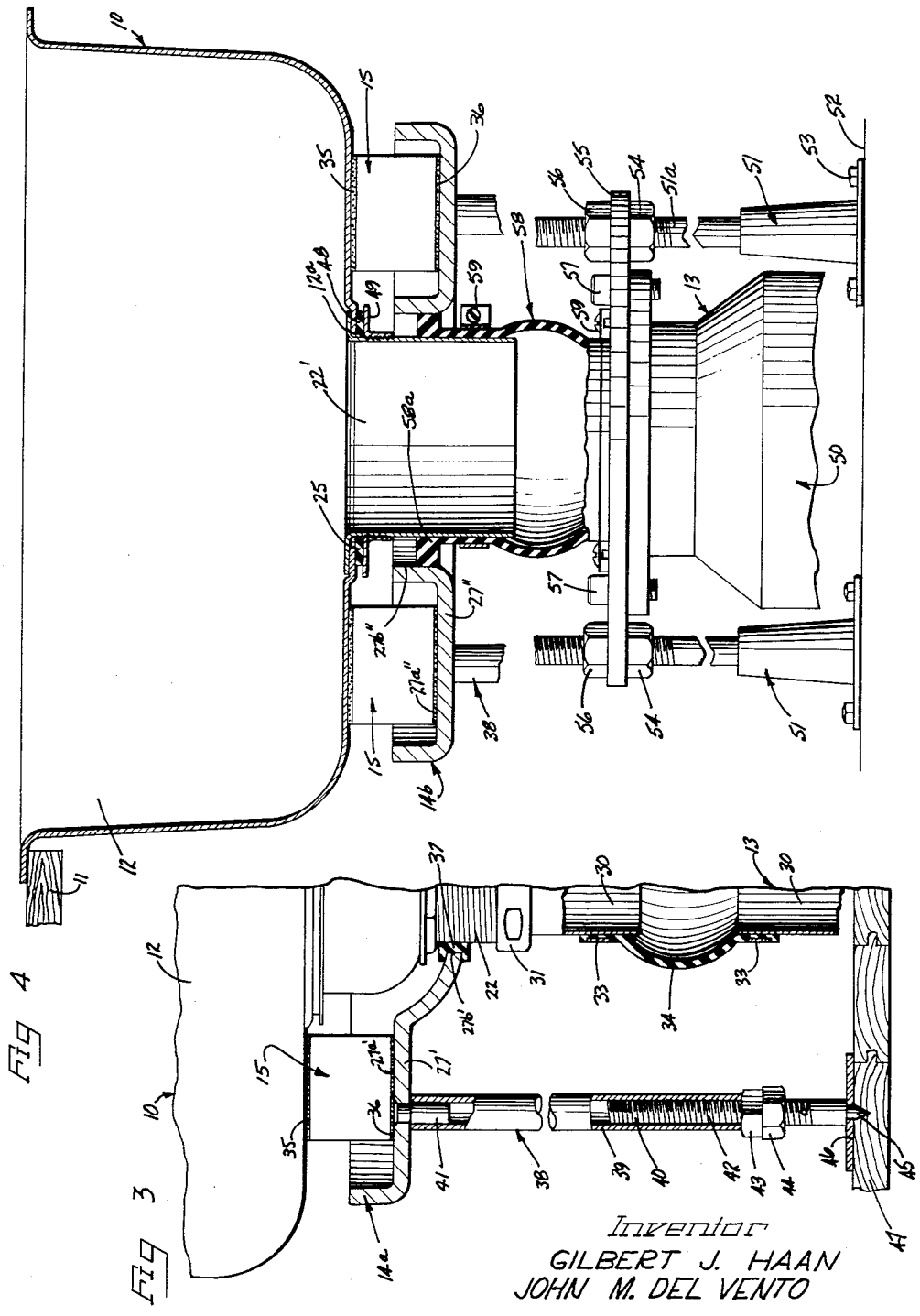

United States Patent Office 3,026,093
Patented Mar. 20, 1962

3,026,093
SINK STRUCTURE FOR ULTRASONIC CLEANING
Gilbert J. Haan and John M. Del Vento, both of 8267 N. Merril Ave., Chicago, Ill.
Filed Aug. 20, 1958, Ser. No. 756,172
15 Claims. (Cl. 259—1)

This invention relates generally to a sink structure including an apparatus for the ultrasonic cleaning of the contents of the sink.

Every minute of every day and every day of every year housewives are the world over engaged in the preparation of meals and in the cleaning of eating and cooking utensils. The principal object of the present invention is to provide a new and improved sink structure including method and means for cleaning articles such as eating and cooking utensils by projecting high frequency sound waves through the sink bowl against the articles suspended in fluid within the sink bowl. It has been found that grease and dirt may be removed from the eating and cooking utensil with improved efficiency and with far less effort on the part of the housewife since the high frequency sound waves operate to loosen and free dirt and grease particles from pots and pans and the like. It has been further shown that where mild detergents have been placed in the dish water that they will clean more effectively and in considerably less time than the strong detergents which may be otherwise required when cleaning the dishes in a conventional manner.

The dishes to be cleaned are submerged in dish water and subjected to high frequency ultrasonic sound waves. During such an operation tiny vacuum bubbles start exerting suction entirely about each of the dishes and pots which suction literally pulls every article of foreign matter off of the dishes and pots. Within a short period of time all surfaces are scoured absolutely clean yet so gentle is the action that the most delicate and fragile dishes are unaffected.

By using an ultrasonic cleaning structure or attachment in combination with a sink bowl conventional space consuming electrical dish washing machines may be dispensed with and the housewife will have more room in her kitchen for storage cabinets and the like.

Ultrasonic cleaning of dishes and pots is a tremendous advance over conventional dish and pot cleaning methods used by the housewife. The dishes and pots may be cleaned faster with a decrease in woman-hours since the cleaning action is rapid, and many parts can be cleaned simultaneously. The cleaning action is safer as the gentle action and mild cleaning solution protect fragile parts. The cleaning action cleans articles more effectively and thoroughly as all surfaces including the most inaccessible spots are completely freed of all impurities.

Accordingly, another important object of the present invention relates to the adaptation of an ultrasonic cleaning device to a kitchen sink bowl.

Still another object of the present invention relates to the provision of an ultrasonic cleaning attachment which may be readily attached to a kitchen sink which is already installed in the kitchen of a home and which attachment facilitates cleaning dishes, and pots and pans.

A further important object of the present invention relates to an apparatus including an electro-mechanical transducer for producing ultrasonic waves which apparatus is adapted for ready assembly with any conventional kitchen sink regardless of whether the sink has been installed in the home as the apparatus may be assembled with the installed sink without necessitating its removal.

Yet another object of the present invention relates to an apparatus including an electro-mechanical transducer for providing ultrasonic waves which may be manufactured and installed at a cost considerably less than the cost of the manufacture and installation of a dishwasher unit.

Another and still further object of the present invention relates to a new apparatus or attachment including an electro-mechanical transducer which attachment is adapted for ready assembly with a conventional kitchen sink having a garbage disposer unit.

According to the general features of the present invention vibration dampening means has been provided on the above described apparatus which is adapted to dampen the ultrasonic waves as well as the vibrations created by the disposer unit where a disposer is in assembly with the kitchen sink.

According to still other more specific features of the present invention a downwardly depending washing sink such as a kitchen sink bowl is suspended from a top support and has a downwardly extending waste pipe at its bottom. The bowl is mounted in combination with ultrasonic cleaning structure which cleaning structure is annularly arranged about the waste pipe and supported by a transducer saddle disc. Transducer structure is mounted on the saddle disc and annularly arranged about the waste pipe. The ultrasonic cleaning structure includes means which bears against the saddle disc pressing and clamping the transducer structure against the bottom of the sink bowl. The ultrasonic cleaning structure comprises electro-mechanical transducers including blocks having top and bottom surfaces respectively engaged with the underside of the sink bottom and the upper surface of the saddle disc. Means is provided for applying a high frequency current to the transducers to cause ultrasonic thickness vibrations of the blocks so that ultrasonic waves are transmitted through the bottom of the sink bowl into the liquid. Vibration dampening means is disposed between the drain pipe and the drain tube to dampen any vibration from the drain pipe to the drain tube.

Other objects and features of the present invention will more fully become apparent in view of the following detailed description taken in conjunction with the drawings illustrating several embodiments.

Figure 2:
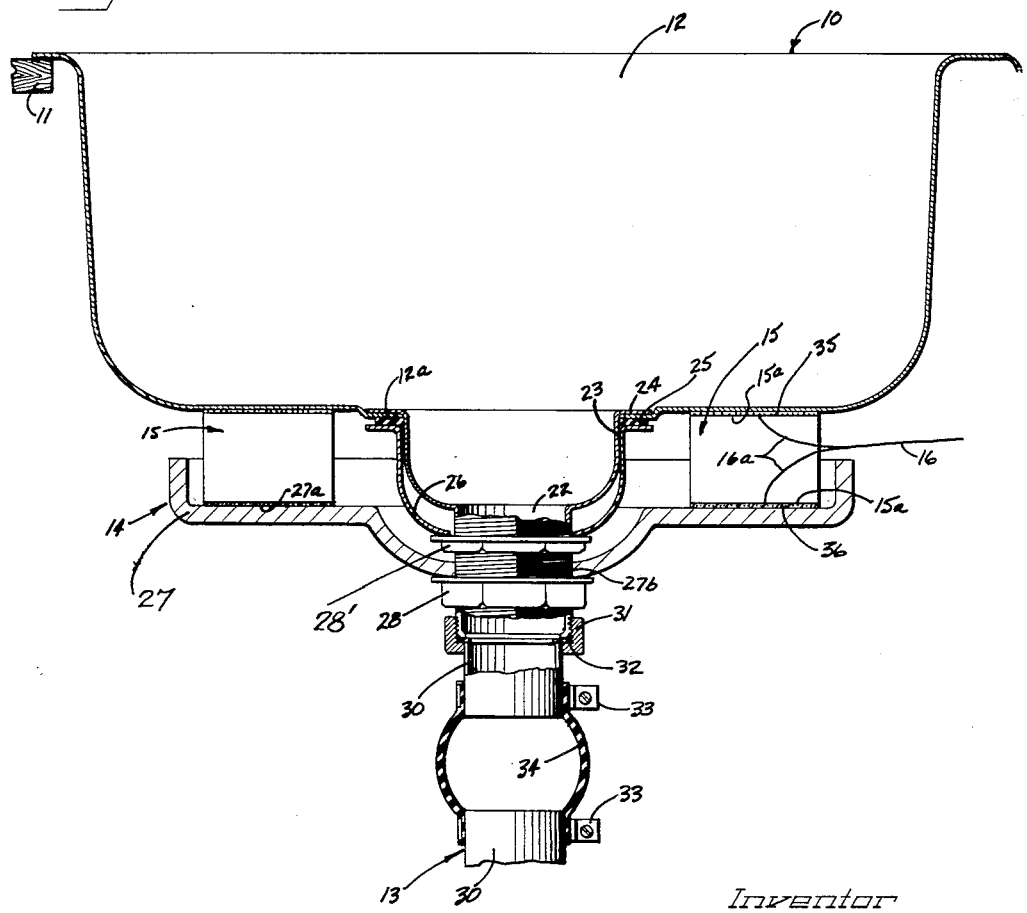
FIGURE 2 is an enlarged fragmentary cross-sectional view of the sink bowl and the ultrasonic cleaning structure shown in FIGURE 1.

FIGURE 3 is an enlarged fragmentary cross-sectional view similar to FIGURE 2 only illustrating a modified combination of a sink bowl and an ultrasonic cleaning structure; and FIGURE 4 is an endless fragmentary cross-sectional view similar to FIGURES 2 and 3 only illustrating still another form of the present invention wherein a disposal unit has been added to the combination of a sink bowl and an ultrasonic cleaning structure.

Figure 1:
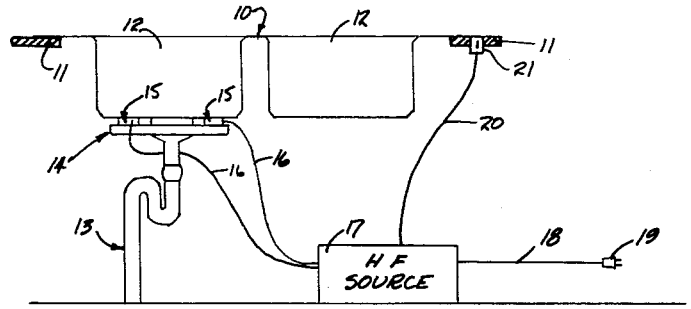
FIGURE 1 is a diagrammatic view of a kitchen sink bowl having ultrasonic cleaning structures mounted thereon.

As shown on the drawings:

The reference numeral 10 in FIGURE 1 indicates generally a sink structure mounted on a counter structure 11. The sink structure is of the double-bowl type with the bowls being identified by the reference numerals 12. Plumbing structure 13 is shown connected to only one of the bowls 12 since the other of the bowls 12 may be drained in any suitable manner. Disposed between the plumbing structure 13 and the bowl 12 is an ultrasonic cleaning structure or attachment indicated at 14 which includes electro-mechanical transducers 15, 15 which transducers abut against the bottom of the sink bowl 12. Cables 16 are connected to a high frequency source 17 and the high frequency source 17 has a cable 18 including a plug 19 for connection in the conventional wall socket found in the building in which the sink structure 10 is mounted. A cable 20 is connected at one end to the high frequency source and is connected at its opposite end to a switch structure 21 mounted upon the counter structure at an area remote from the ultrasonic cleaning structure so the housewife may readily turn the ultrasonic cleaning attachment or structure on and off according to her needs.

As has been described previously in detail, the ultrasonic cleaning structure or attachment is adapted to provide ultrasonic cleaning waves or vibrations which are directed through the underside area of the sink bowl 12. The underside or bottom area includes the sink bottom and side wall and as shown the vibrations travel vertically through the sink bottom. When the sink bowl 12 is filled with fluid and dirty dishes, pots, and pans and the like are disposed therein, these articles to be cleaned may be cleaned in a much more effective and efficient manner.

The plumbing structure 13 includes a waste or drain pipe 22 having an enlarged cup-shaped portion 23 disposed adjacent a sink annulus 12a defining a bowl outlet and the cup-shaped portion has a turned flange area 24 seated about the annulus 12a within the confines of the sink bowl 12. In other words, the flange area 24 is lapped on top of the bowl 12 about the opening defined by the annulus 12a. A rubber gasket 25 is disposed at the underside of the bowl 12 about the opening 12a and a gasket compression cup 26 is engaged against the underside of the rubber gasket 25. A gasket compression nut 28' is threaded onto the waste pipe 22 and this nut 28' bears against the gasket compression cup to seal the sink bowl annulus 12a with respect to the waste pipe 22 so that moisture cannot escape at the joint between the bowl annulus 12a and the waste pipe 22.

The ultrasonic cleaning structure 14 includes a transducer saddle disc or vertically adjustable transducer support structure 27 which is generally cup-shaped and has an annular ledge or surface 27a upon which the transducers 15 are supported. The disc 27 also has a central opening 27b and the waste pipe 22 is telescoped through this opening and a saddle disc compression nut 28 is threaded onto the waste pipe to clamp the ledge or surface 27a against the block or transducer 15 and thereby bottom the upper surface of the block 15 against the bottom area of the sink bowl 12.

Secured to the bottom end of the drain pipe 22 is a drain tube 30 and the drain tube is held in assembly with the drain pipe by means of a drain attaching nut 31. To provide a seal between the drain tube 30 and the drain pipe 22, a gasket 32 is disposed therebetween.

As is shown in FIGURE 2 the drain tube 30 has been divided into two segments and hose clamps 33—33 operate to attach a ball type flexible sleeve pulsation dampener or insulator 34 in assembly between the drain tube segments 30—30.

The electro-mechanical transducers 15 may preferably be plates or blocks of piezo-electric material, such as quartz, barium titanite or equivalent materials, to which an alternating electric field may be applied to cause thickness vibrations. Such plates or blocks may have electrodes such as are indicated at 15a—15a cemented to or deposited on the opposite faces thereof, to be connected to cable terminals 16a—16a which are in turn connected to the high frequency source by the cable 16. It is also possible to use the sink bottom and/or the saddle disc as electrodes, providing they are properly contacted with the blocks and properly insulated from each other. It may also be possible to use blocks or bars of magnetostrictive material having opposite faces engaged with the saddle disc and the sink bottom, with coils therearound being connected to the high frequency source.

With any of such transducers, it will be noted that the saddle disc arrangement is particularly advantageous in that the disc serves to firmly press the blocks against the sink bottom to insure efficient transmission of ultrasonic energy into the liquid in the bowl.

The upper face 15a of transducer blocks should preferably be cemented at 35 to the underside of the sink bottom. The cement fills any voids, cracks, pockets or crevices that may be found in the underside of the sink bottom and promotes efficient transfer of the ultrasonic energy. The cement may also serve to insulate the electrode from the sink bottom, if insulation is desired, or a separate layer of insulation may be used, care being taken to insure good acoustical coupling to the sink bottom. A layer of insulation 36 is provided between the bottom electrode 15a and the saddle disc surface 27a.

In FIGURE 3 a slightly modified ultrasonic cleaning structure 14a is shown. In this connection a saddle disc 27' is provided which disc includes a transducer supporting ledge or edge 27a' and a central opening 27b'. A flexible snap-in-place grommet 37 is disposed between the waste or drain pipe 22 and the edge of the saddle disc defining the opening 27b'. This grommet 37 operates to insulate or dampen any vibrations created by the transducer block 15.

The structure 14a also differs from the structure 14 shown in FIGURE 2 in that a leg structure 38 has been provided to support the saddle disc 27' in a manner whereby the block 15 is bottomed against the bottom of the bowl 12 and against the saddle disc ledge 27a'.

Any suitable number of legs 38 may be used to support the saddle disc 27'. The leg 38 is comprised of a pair of relatively movable portions 39 and 40 with the portion 39 being tubular and with the portion 40 being telescoped inside of the tubular portion 39. The tubular portion 39 is secured to the saddle disc 27' by means of a stud 41 riveted in place. The portion 40 is threaded at 42 and a pair of nuts 43 and 44 are in threaded assembly upon the threaded portion 42 and these nuts cooperate with the threaded portion 42 so that the tubular portion 39 may be elevated or lowered to bring about assembly or break down of the component parts of the ultrasonic cleaning structure 14. In order to provide a firm footing for the leg 38 the bottom end of the threaded portion 42 is provided with a location point 45 which is adapted to extend through a bearing plate 46 into a conventional wood floor 47 as is found in most kitchens.

Shown in FIGURE 4 is still another modified form wherein an ultrasonic cleaning attachment or structure is indicated generally at 14b which structure includes a U-shaped transducer saddle disc 27.″ The disc 27″ includes a block supporting surface 27a″ and an annular flange edge defining an opening indicated at 27b.″ The disc 27″ is supported by the leg structure 38 as shown and described in connection with FIGURE 3.

The bowl 12 is provided with a bowl opening 12a and a waste or drain pipe 22' is mounted in assembly therewith in much the same manner as is shown in FIGURE 2. In this respect, however, a slightly different seal means is shown for locking gasket 48 against the bottom side of the bowl 12. To this end, a threaded compression collar 49 is in threaded assembly with the drain pipe 22' to clamp the gasket 48 in position against the bowl 12.

Disposed below the waste or drain pipe 22' is a disposal unit indicated generally at 50 which may be connected to a drain tube, in a conventional manner. Vertical posts 51 are supported on a floor line 52 and are bolted in place at 53. These posts 51 each include a vertical threaded shank portion 51a and a first pair of nuts 54 are threaded onto the threaded shank portions 51a. A disposal hanger plate 55 is supported by the nuts 54—54 and a second pair of nuts 56 operate to clamp the plate 55 in assembly with the posts 51—51. The disposed unit 50 is suspended from the hanger plate 55 by means of screws 57—57.

Disposed between the drain pipe 22' and the disposer unit 50 is a ball-type flexible sleeve pulsation dampener or insulator 58. The vertical upper end of the damper 58 is provided with an annular beaded area 58a which is interposed between the disc edge defining the opening 27b'' and the waste or drain pipe 22'. Clamps 59—59 are provided for clamping the dampener 58 to the drain pipe 22' and to the disposer unit 50.

The operation of the ultrasonic cleaning structure 14a and 14b illustrated in FIGURES 3 and 4 is the same as has been previously described in connection with the ultrasonic cleaning structure 14 as shown in FIGURES 1 and 2. In all forms of the invention, the transducer blocks 15 when energized operate to cause vibration waves to be transmitted through the bottom of the sink bowl 12 in a manner whereby the fluid suspended articles are cleaned. Ultrasonic vibration dampening means is provided in all forms of the invention to prevent the transmission of the ultrasonic waves from the sink along the length of the waste fluid drain line which line connects the bowl with a sewer line and is illustrated as including the waste pipe 13 as well as the drain tube 30 and the garbage disposal unit 50, where such a unit is used.

It will be understood that modifications and variations may be effected without departing from the scope of the novel concepts of the present invention.

We claim as our invention:

1. In combination, a kitchen sink bowl suspended from a top support and having a downwardly extending waste pipe at its bottom, and ultrasonic cleaning structure annularly arranged about the waste pipe including a transducer saddle disc having a waste-type opening with the waste pipe extending through said opening, the ultrasonic cleaning structure having transducer structure mounted on the saddle disc and annularly arranged about the waste pipe, the ultrasonic cleaning structure including means bearing against the saddle disc pressing and clamping the transducer structure against the bottom of the sink bowl.

2. In combination, a kitchen sink bowl suspended from a top support and having a downwardly extending waste pipe at its bottom, and ultrasonic cleaning structure annularly arranged about the waste pipe including a transducer saddle disc having a waste-type opening with the waste pipe extending through said opening, the ultrasonic cleaning structure having transducer structure mounted on the saddle disc and annularly arranged about the waste pipe, the ultrasonic cleaning structure including means bearing against the saddle disc pressing and clamping the transducer structure against the bottom of the sink bowl, said transducer structure comprising electro-mechanical transducers having top and bottom surfaces respectively engaged with the underside of the sink bottom and the upper surface of the saddle disc, and means for applying a high frequency current to said transducers to cause ultrasonic thickness vibration of said transducers whereby ultrasonic waves are transmitted through the bottom of the sink bowl into the liquid.

3. In combination, a kitchen sink bowl suspended from a top support and having a downwardly extending waste pipe at its bottom, and ultrasonic cleaning structure annularly arranged about the waste pipe including a transducer saddle disc having a waste-type opening with the waste pipe extending through said opening, the ultrasonic cleaning structure having transducer structure mounted on the saddle disc and annularly arranged about the waste pipe, the ultrasonic cleaning structure including means bearing against the saddle disc pressing and clamping the transducer structure against the bottom of the sink bowl, said transducer structure comprising electro-mechanical transducers having top and bottom surfaces respectively engaged with the underside of the sink bottom and the upper surface of the saddle disc, means for applying a high frequency current to said transducers to cause ultrasonic thickness vibration of said transducers whereby ultrasonic waves are transmitted through the bottom of the sink bowl into the liquid, the waste pipe being connected to a drain tube, and vibration dampening means between the waste pipe and the drain tube to dampen any vibration from the waste pipe to the drain tube.

4. The combination of claim 3 further characterized by the dampening means comprising a ball shaped flexible sleeve pulsation insulator.

5. The combination of claim 2 further characterized by the saddle disc having a central opening with the waste pipe telescoped through the opening and with the means bearing against the saddle disc including a nut having threads, and the waste pipe having threads adjacent the opening whereby the nut may be telescoped over the waste pipe in threaded assembly holding the top and bottom surfaces of the blocks in engagement with the saddle disc as well as the underside of the sink bowl.

6. The combination of claim 2 further characterized by the means bearing against the saddle disc comprising legs engaged at one end against the saddle disc and engaged at another end against the supporting floor surface, the legs having relatively movable leg portions and nuts for adjusting the vertical height of the legs enabling the leg portions to be vertically moved relative to one another between the saddle disc and the supporting floor surface and thereby bottom the saddle disc against the transducers and bottom the transducers against the underside of the sink bowl.

7. In combination, a kitchen sink having a downwardly extending waste pipe at its bottom, and electro-mechanical transducer structure annularly arranged about the waste pipe including a supporting structure comprising a transducer saddle disc having a waste pipe opening with the waste pipe extending through said opening, the transducer structure including at least one block mounted on the saddle disc and annularly arranged about the waste pipe, the block having spaced surface areas respectively engaged with the underside area of the sink and a surface area of the saddle disc, the transducer structure including means for applying a high frequency current to said transducer structure to cause ultrasonic thickness vibration of said block whereby ultrasonic waves are transmitted through the underside area of the sink into the liquid.

8. In combination, a downwardly depending washing sink having a downwardly extending threaded waste pipe at its bottom, and electro-mechanical transducer structure annularly arranged about the waste pipe including a supporting structure comprising a transducer saddle disc, the transducer structure including at least one block mounted on the saddle disc and annularly arranged about the waste pipe, the block having spaced surface areas respectively engaged with the underside area of the sink and a surface area of the saddle disc, the transducer structure including means for applying a high frequency current to said transducer structure to cause ultrasonic thickness vibration of said block whereby ultrasonic waves are transmitted through the underside area of the sink into the liquid, the saddle disc having a central opening with the waste pipe telescoped through the opening the transducer structure having means bearing against the saddle disc which includes a nut having threads whereby the nut may be telescoped over the threaded waste pipe in threaded assembly holding the top and bottom surfaces of the blocks in engagement with the saddle disc as well as the underside of the sink bowl.

9. In combination, a kitchen sink having a downwardly extending waste pipe at its bottom, and electro-mechanical transducer structure annularly arranged about the waste pipe including a supporting structure comprising a transducer saddle disc having a waste pipe opening with the waste pipe extending through said opening, the transducer structure including at least one block mounted on the saddle disc and annularly arranged about the waste pipe, the block having spaced surface areas respectively engaged with the underside area of the sink and a surface area of the saddle disc, the transducer structure including means for applying a high frequency current to said transducer structure to cause ultrasonic thickness vibration of said block whereby ultrasonic waves are transmitted through the underside area of the sink into the liquid, the transducer structure having means bearing against the saddle disc comprising legs engaged at one end against the saddle disc and engaged at another end against the supporting floor surface, the legs having relatively movable leg portions and nuts for adjusting the vertical height of the legs enabling the leg portions to be moved vertically relative to one another between the saddle disc and the supporting floor surface and thereby bottom the saddle disc against the blocks and bottom the blocks against the underside of the sink bowl.

10. The combination of claim 7 further characterized by vibration dampening structure interposed between the saddle disc and the waste pipe.

11. In combination, a sink structure including a kitchen sink bowl having a waste fluid drain line connected to the sink bowl extending below the sink bottom, and an ultrasonic cleaning attachment for ready assembly with the sink structure, the attachment when assembled with the sink being disposed about the periphery of the waste fluid drain line and having transducer structure engaged against an underside area of the sink bowl, the ultrasonic cleaning attachment having transducer support structure bearing against said transducer structure supporting the transducer structure and maintaining the transducer structure bottomed against the underside area of the sink bowl, said attachment including means connected to the transducer structure for applying a high frequency current to said transducer structure to cause ultrasonic thickness vibration of said transducer structure whereby ultrasonic waves are transmitted through the bottom area of the sink into the liquid contained therein, the attachment having vibration dampening means connected to the waste fluid drain line to resist the transmission of the ultrasonic waves from the sink along the length of the waste fluid drain line.

12. An ultrasonic kitchen sink cleaning attachment for ready assembly with a kitchen sink which is adapted to be disposed about the periphery of a kitchen sink waste fluid drain line, the attachment having transducer structure for engagement against an underside area of the sink bowl, the ultrasonic cleaning attachment having transducer support structure bearing against said transducer structure for supporting and maintaining the transducer structure in bottomed engagement against the underside area of the sink bowl and which transducer support structure has a central open area defining a passage through the transducer support structure for receipt of the kitchen sink waste fluid drain line therethrough, vertically movable means connected to the transducer support structure for urging the transducer structure into abutment with the underside area of the sink, and means connected to the transducer structure for applying a high frequency current to said transducer structure to cause ultrasonic thickness vibration of said transducer structure whereby ultrasonic waves are transmitted through the bottom area of the sink into the liquid contained therein, said vertically movable means including a threaded drain pipe and a threaded nut which nut when assembled on the drain pipe bears against the transducer support structure providing the means for urging the transducer structure against the sink.

13. In combination, a kitchen sink bowl suspended from a top support, and with the washing sink having a downwardly extending waste pipe at its bottom, and ultrasonic cleaning structure including a transducer saddle disc having a waste pipe opening with the waste pipe extended through said opening, the ultrasonic cleaning structure having transducer structure mounted on the saddle disc and annularly arranged about the waste pipe, the ultrasonic cleaning structure including means bearing against the saddle disc pressing and clamping the transducer structure against the bottom of the sink bowl, said transducer structure having upper and lower spaced electrodes, an upper layer of insulation disposed between the upper electrode and the sink and a lower layer of insulation disposed between the lower electrode and the transducer saddle disc, said transducer structure being connected to a high frequency power source by means of a cable having a pair of cable terminals with one of the cable terminals connected to the upper electrode and another of the cables connected to the lower electrode.

14. The combination of claim 13 further characterized by vibration dampening means disposed below said disc between said waste pipe and a drain tube to dampen vibration from the waste pipe to the drain tube.

15. The combination of claim 13 further characterized by the upper layer of insulation comprising a layer of cement filling the pockets on the sink bottom and joining the sink bottom with the transducer structure to promote efficient transfer of ultrasonic energy from the transducer structure to the sink, said means bearing against the saddle disc pressing and clamping the transducer structure against the bottom of the sink bowl including vertical adjustment means enabling the means to be moved vertically into and out of engagement with said saddle disc to facilitate assembly of the ultrasonic cleaning structure on a sink bowl.

References Cited in the file of this patent

UNITED STATES PATENTS

| | | |
|---|---|---|
| 1,139,313 | Stevens | May 11, 1915 |
| 2,089,962 | Huttinger | Aug. 17, 1937 |
| 2,760,501 | Gander | Aug. 28, 1956 |
| 2,854,012 | Murdoch | Sept. 30, 1959 |
| 2,937,292 | Welkowitz | May 17, 1960 |